United States Patent
Kim et al.

(10) Patent No.: US 7,231,009 B2
(45) Date of Patent: Jun. 12, 2007

(54) DATA SYNCHRONIZATION ACROSS AN ASYNCHRONOUS BOUNDARY USING, FOR EXAMPLE, MULTI-PHASE CLOCKS

(75) Inventors: Gyudong Kim, Sunnyvale, CA (US); Min-Kyu Kim, Cupertino, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 656 days.

(21) Appl. No.: 10/371,220

(22) Filed: Feb. 19, 2003

(65) Prior Publication Data
US 2004/0161067 A1     Aug. 19, 2004

(51) Int. Cl.
*H04L 7/00* (2006.01)

(52) U.S. Cl. .............. 375/354; 375/355; 375/370; 375/373; 375/375; 327/3; 327/7; 327/40; 327/42; 331/25

(58) Field of Classification Search .......... 327/141; 375/316, 354, 355, 370
See application file for complete search history.

(56) References Cited

U.S. PATENT DOCUMENTS

| | | | | |
|---|---|---|---|---|
| 5,432,823 A | * | 7/1995 | Gasbarro et al. | 375/356 |
| 5,548,622 A | * | 8/1996 | Ma | 375/354 |
| 6,008,680 A | * | 12/1999 | Kyles et al. | 327/277 |
| 6,639,956 B1 | * | 10/2003 | Song | 375/354 |
| 6,724,683 B2 | * | 4/2004 | Liao | 365/233 |
| 6,949,958 B2 | * | 9/2005 | Zerbe et al. | 327/3 |
| 2002/0131539 A1 | * | 9/2002 | Li et al. | 375/355 |
| 2003/0141908 A1 | * | 7/2003 | Stong | 327/141 |

\* cited by examiner

*Primary Examiner*—Chieh M. Fan
*Assistant Examiner*—Siu M. Lee
(74) *Attorney, Agent, or Firm*—Perkins Coie LLP

(57) ABSTRACT

Additional information on the phase of an external clock signal is obtained by using clock signals to determine if a phase difference between an external clock signal and a first internal sampling clock signal is less than a pre-selected value. If the system determines that the phase difference is less than a pre-selected value, one embodiment samples the incoming data with a second internal sampling clock signal, having a selected phase relationship to the first internal sampling clock signal, such as ½ a clock period out of phase. By maintaining sufficient phase difference between the active edge of the external clock and the active edge of the internal sampling clock, the embodiment provides a sufficient setup/hold margin to avoid a metastability or other problem in a subsystem receiving data across an asynchronous boundary.

12 Claims, 5 Drawing Sheets

DATA SYNCHRONIZATION ACROSS AN ASYNCHRONOUS BOUNDARY USING, FOR EXAMPLE, MULTI-PHASE CLOCKS

BACKGROUND

1. Technical Field

Embodiments of the invention relate to systems and methods for transferring synchronous digital signals across an asynchronous boundary.

2. Description of the Background

In systems using digital circuitry, two functional blocks or subsystems operating in two different timing domains often communicate with one another. When these two blocks operate in synchrony with a single digital clock signal, transfer of digital data between the two blocks does not present a problem. However, when two digital subsystems operate in synchrony with different clock signals, any digital data signals traveling between the subsystems should be synchronized in some manner to avoid data errors.

If, for example, two digital subsystems operate in synchrony with different clocks, the system should resynchronize the digital data signals traveling from one subsystem to the other subsystem. In other words, if data signals travel from a first subsystem in an external clock domain to a second subsystem in an internal clock domain, the digital system should resynchronize the data signals with an internal clock signal at the asynchronous boundary. Similarly, if data signals travel an internal clock domain to an external clock domain, the digital system should resynchronize the data signals with an external clock signal at the asynchronous boundary. Without such resynchronization, a hardware "metastability" problem can result in clocked devices of the receiving subsystem, thereby producing invalid logic results. Metastability generally refers to a circuit or system that has an unstable and transient, but relatively long-lived state. The problem of metastability is well known in the art, and can be illustrated, for example, by operation of a bistable latch.

A bistable latch requires the coincident occurrence of two pulses, e.g., a data pulse and a clock pulse, to change the state of the latch. In a bistable latch, a "metastable" state can occur when the two actuating pulses do not overlap sufficiently in time to permit the bistable latch to completely switch from one stable state to the other. With insufficient overlap, such as setup time violation or hold time violation can occur when a clock pulse is poorly synchronized with a data pulse, the bistable latch output can move from one stable level to the other and then back again. In the context of two distinct clock domains, the metastable latch problem occurs when a clock pulse from one domain overlaps insufficiently with a data pulse synchronized to a clock pulse from another domain.

Stated another way, a clocked bistable latch can malfunction if the data input changes during the setup-time interval preceding a clock pulse. As long as the clocked bistable latch makes some decision upon receipt of the active edge of the clock pulse, the circuit incorporating the latch will operate properly. An incoming transition edge of a data signal should occur before a transition edge of a clock signal to the latch. However, if the input changes at a particularly bad time within the setup-time, the clocked bistable latch can hover at the logic threshold or the clocked bistable latch can go into one state and then switch back to the other state. Stated yet another way, a clocked bistable latch can malfunction if the data input changes during the hold-time interval following a clock pulse.

One method of determining whether a problem in data synchronization across asynchronous boundaries will occur is to employ a higher frequency clock. The higher frequency clock may then determine the relationship between clocks in each of two asynchronous domains. However, a higher frequency clock requires circuitry to have less margin of error, thereby making associated circuitry more difficult to design.

Thus, a need exists for systems and methods of transferring synchronous digital signals across an asynchronous boundary separating a transmitting subsystem and a receiving subsystem. A need exists for a system that avoids data transitions during the setup times for clocked devices within the receiving subsystem. Moreover, there is a need for systems and methods to compensate for clock/data synchronization errors in general.

Figure 1:
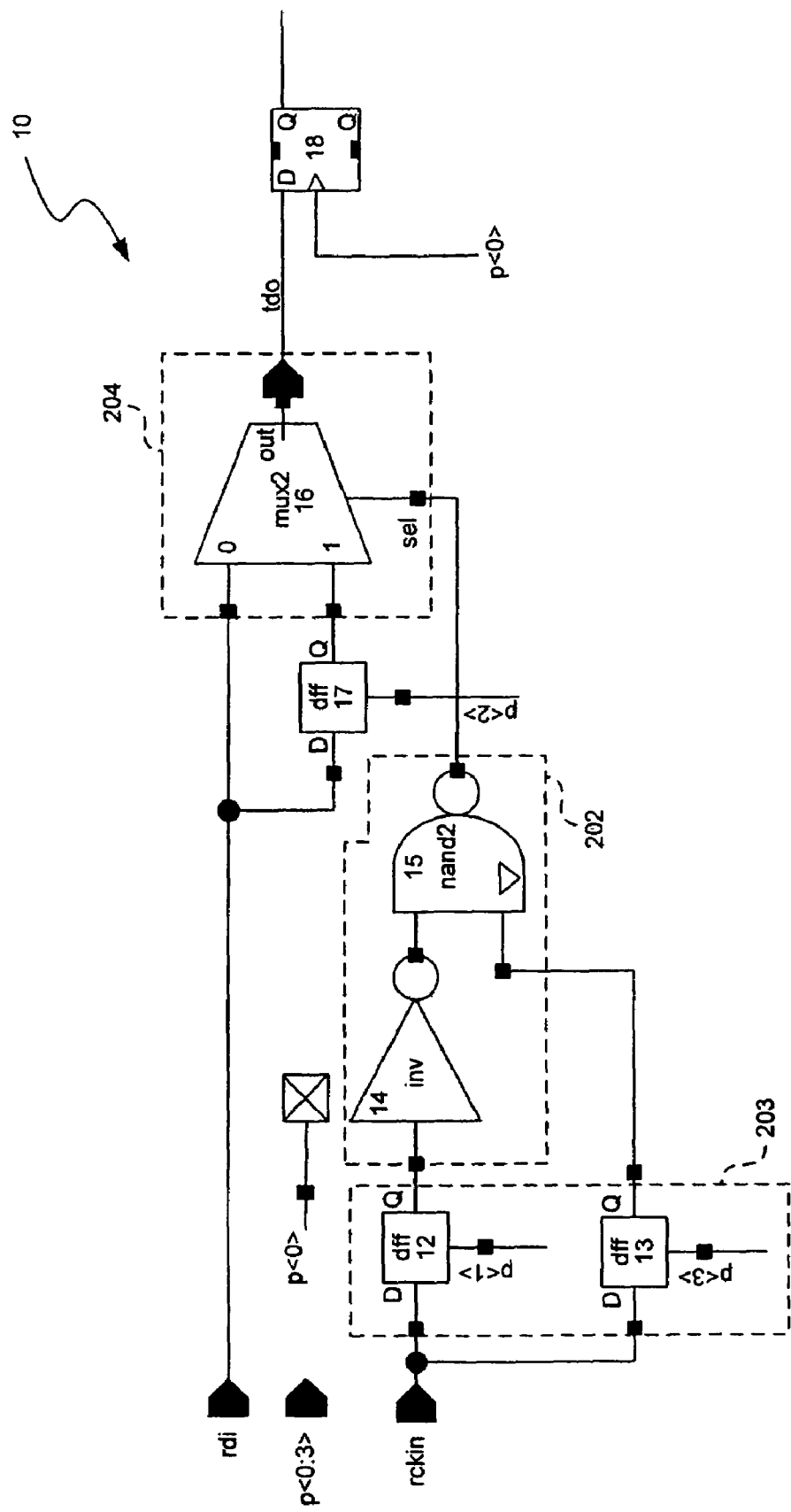
FIG. 1 is a circuit diagram of a retiming circuit according to one embodiment of the invention.

The headings provided herein are for convenience only and do not necessarily affect the scope or meaning of the claimed invention.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. For each embodiment, the same reference numbers and acronyms identify elements or acts with the same or similar functionality for ease of understanding and convenience.

This invention relates to systems and methods for transferring synchronous digital signals, such as across an asynchronous boundary. Data transfer over a boundary separating an external clock domain and an internal clock domain can cause elements of the receiving circuit to enter a metastable state. One embodiment of the invention provides a method of data synchronization across an asynchronous boundary with two non-synchronous clocks of the same frequency, using a system having multi-phase clock signals. The method uses multi-phase clock signals to determine if the phase difference between an active edge of an external clock signal and the active edge of the $0^{th}$ phase of an internal sampling clock signal is less than a pre-selected value. If this phase difference is too small, the subsystem receiving data across the asynchronous boundary can experience metastability problems.

If the system determines that the phase difference between the edges of the clock signals is less than a pre-selected value, the method samples the incoming data with a second internal sampling clock signal, having a selected phase relationship to the first internal sampling clock signal. For example, if the system determines that the rising edge of the external clock signal is near to that of a first internal clock signal, then the system effectively latches data based on a falling edge of the external clock signal (based on a second clock signal 180° out of phase with the first internal clock signal). By maintaining sufficient phase difference between the active edge of the external clock and the active edge of the internal sampling clock, the system provides a sufficient setup/hold margin to avoid a metastability or other problem in the subsystem receiving data across an asynchronous boundary.

By obtaining information about the phase of the external clock, an embodiment according to the invention can avoid this metastability problem. This embodiment uses two phases of multi-phase clock signals to obtain information about the phase of an external clock, and thereby determine whether a first $0^{th}$ clock signal, or a 180° out of phase second phase clock signal is to be used.

Details regarding a specific circuit for implementing an aspect of the invention are first described with respect to FIG. 1. Examples of signals employed by the circuit of FIG. 1 are then discussed. Thereafter, a block diagram illustrating a broad implementation of another aspect of the invention is described. Finally, two methods of performing data synchronization are discussed.

Figure 2:
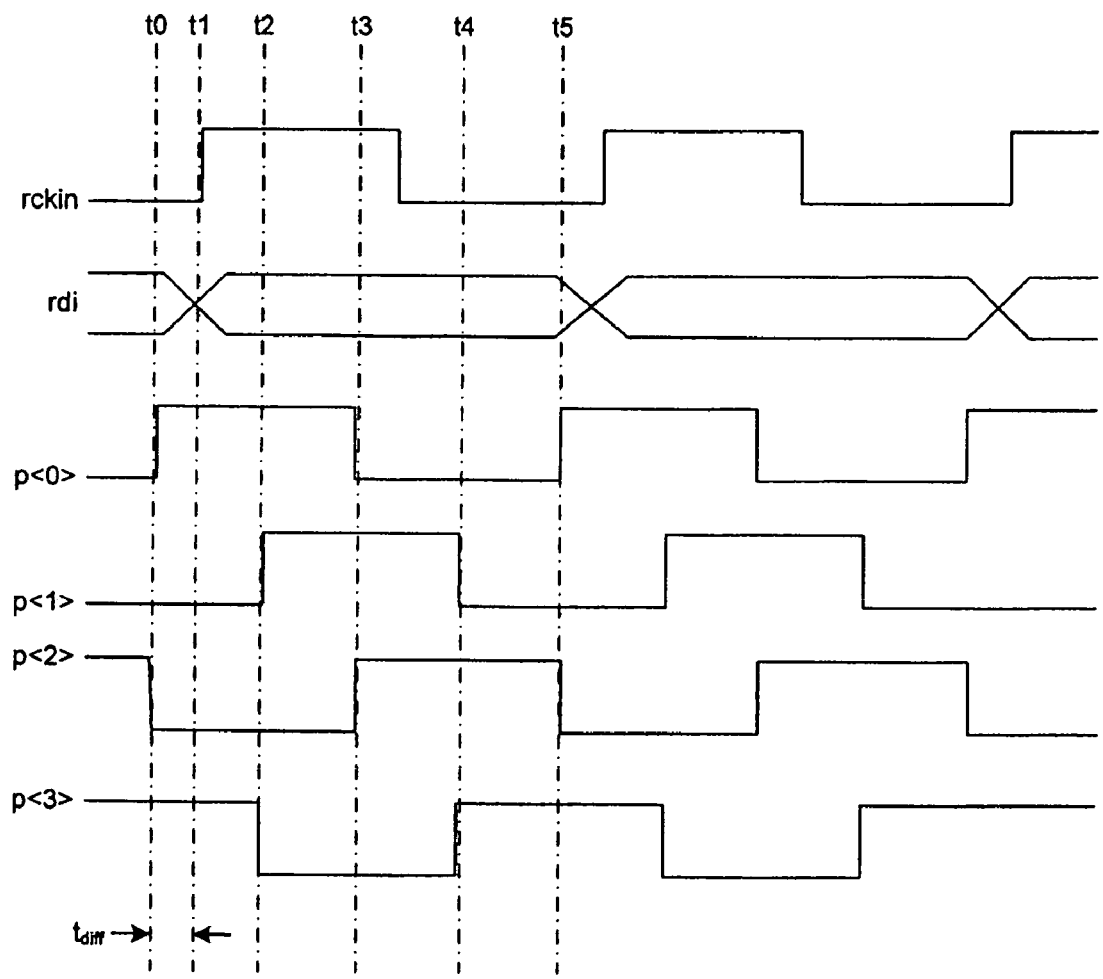
FIG. 2 illustrates the waveforms of external and internal clocks and of incoming data used as inputs by the retiming circuit of FIG. 1.

FIG. 1 shows a schematic diagram for a synchronization or retiming circuit 10 for transferring synchronous digital data over an asynchronous boundary. FIG. 2 illustrates the waveforms of an external clock signal ("rckin"), of an incoming data signal ("rdi") and of four internal clock signals each having a distinct phase ("p<0>" through "p<3>"). In one embodiment, the retiming circuit of FIG. 1 receives all six signals illustrated in FIG. 2 as inputs. The illustrated scheme uses four internal clock signals each having a distinct phase, p<0>–p<4>, where the $1^{st}$, $2^{nd}$ and $3^{rd}$ phase internal clock signals p<1>, p<2>, and p<3> are 90, 180 and 270 degrees, respectively, out of phase with the $0^{th}$ clock signal p<0>, but all clock signals have the same frequency.

Various circuits and methods are possible for creating such four clock signals. For example, four separate clocks may be provided, a single clock with several delays to provide clock signals of different phases may be provided, a phase locked loop ("PLL") or a delay locked loop ("DLL") could supply these multi-phase clock signals, etc. The four clock signals should be synchronized with each other. As will be obvious to those of skill in the art, other embodiments of the invention can use more or less than four phases, all depending upon other factors relevant to the particular implementation.

Details regarding the depicted retiming circuit 10 will be described first, followed by detailed discussions regarding its operation. The retiming circuit 10 may be placed at a boundary between two asynchronous clocks, such as at the boundary between one subsystem operating under an external clock signal, and a second subsystem operating under an internal clock signal. The retiming circuit shown in FIG. 1 receives an external clock signal on a line "rckin." In this example, the external clock signal rckin cannot be used to latch data out of the retiming circuit 10 because a metastability condition could arise if the rising edge of this clock signal coincides with data transition and with the $0^{th}$ phase of the internal clock.

The line rckin couples to inputs of D flip-flops 12 and 13. The D flip-flop 12 receives the $1^{st}$ phase of the internal clock signal p<1> and samples the external clock signal rckin at the rising edge of the $1^{st}$ clock signal p<1>. Similarly, the D flip-flop 13 receives the $3^{rd}$ phase of the internal clock signal p<3> and samples the external clock signal rckin at the rising edge of the $3^{rd}$ clock signal p<3>. The output of the D flip-flop 12 passes through an inverter 14 before coupling to a first input of a two input NAND gate 15, while the output of the D flip-flop 13 couples directly to the other input of the NAND gate. As explained more fully below, the D flip-flops 12 and 13, together with the first and third internal clock signals p<1> and p<3> sample the external clock signal, while the inverter 14 and NAND gate 15 determine where the rising edge of the external clock signal rckin occurs. The output of the NAND gate 15 couples to the control input of a multiplexer (MUX) 16, which has two data inputs and one output.

The retiming circuit 10 receives an incoming data signal on a line "rdi." The line rdi couples to a first data input of the MUX 16 and to the input of a D flip-flop 17. The D flip-flop 17 receives the $2^{nd}$ phase of the internal clock signal p<2> and samples the incoming data signal at the rising edge of the $2^{nd}$ clock signal p<2>. The output of the D flip-flop 17 couples to the second input of MUX 16.

In operation, the $0^{th}$ phase internal clock signal p<0> is assumed to be synchronized with the incoming data, but if a possible metastability condition or other problem could exist, a clock signal out of phase with p<2> is used instead. The D flip-flops 12 and 13 are triggered by the rising edges of the $1^{st}$ and $3^{rd}$ internal clock signals, p<1> and p<3>, respectively, of the multiple-phase clocks. Together with the inverter 14 and NAND gate 15, the D flip-flops 12 and 13 effectively operate to detect the phase of the external clock signal rckin. If the output of the NAND gate 15 is high, the MUX 16 selects the output of the D flip-flop 17 using the $2^{nd}$ internal clock signal p<2> for latching data. Alternatively, if the output of the NAND gate 15 is low, the MUX 16 selects the first input coupled directly to the rdi line. Finally, a D flip-flop 18, triggered by the $0^{th}$ internal clock signal p<0> samples the output of the MUX 16.

With reference to FIG. 2, assume the incoming external clock signal, rckin, sampled at the rising edge of the $1^{st}$ internal clock signal p<1>, has a high or '1' value, as shown at time t2. Also assume that the external clock signal rckin, sampled at the rising edge of the $3^{rd}$ internal clock signal p<3>, has a low or '0' value, as shown at time t4. Given these assumptions, the falling edge of rckin is therefore between the rising edges of the $1^{st}$ and the $3^{rd}$ internal clock signals, p<1> and p<3>. In such a case, the rising edge of rckin and the rising edge of $0^{th}$ internal clock signal p<0> (time t0) are close to each other. Stated differently, the phase difference between the active edges of rckin and p<0> are less than a pre-selected value, as shown as a time difference tdiff between time t0 and time t1.

Designers want to avoid latching near the transitions of the incoming data because of the potential for a setup/hold-time violation, metastability problem, or other problem. In most systems or subsystems, the active edges of the external clock correlate with the transitions of the incoming data. As a result, when the phase difference between the active edges of rckin and p<0> are less than a pre-selected value, the retiming circuit uses the $2^{nd}$ internal clock signal p<2> (approximately 180° out of phase with p<0>) for latching the incoming data. If the phase difference between the active edges of the external clock and p<0>, tdiff in FIG. 2, are larger than or equal to a pre-selected value (e.g., a quarter of a clock cycle), the retiming circuit uses the $0^{th}$ internal clock signal p<0> for latching the incoming data rdi. This embodiment gives setup/hold margin proportional to clock period, which is neither process nor technology dependent, and also more tolerant to relative jitter between two non-synchronous clocks, because the absolute amount of relative jitter is likely to increase at lower clock frequency.

As will be obvious to those of skill in the art, other embodiments of the retiming circuit are possible. For example, an alternative circuit could use or receive more than four phases of internal multi-phase clock signals, and have accompanying changes in circuitry. Also the NAND gate 15 could be replaced by more complicated logic to deal with the case where the phase difference between two non-synchronous clocks varies dynamically.

Figure 5:
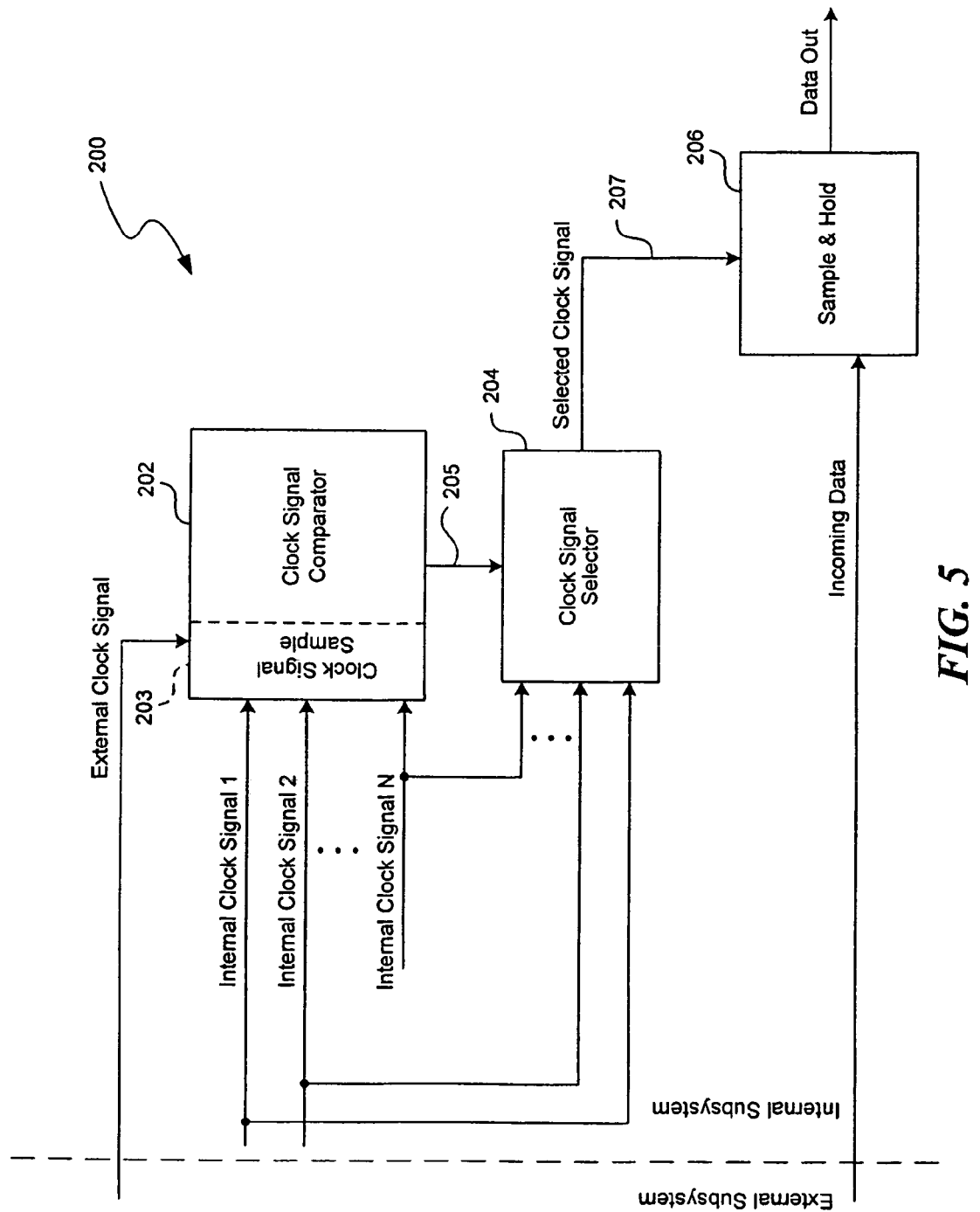
FIG. 5 is a block diagram of a system for providing data synchronization under an embodiment of the invention.

The retiming circuit 10 of FIG. 1 is only one example of an implementation of a broader retiming system 200 shown in FIG. 5. Referring to FIG. 5, the retiming system 200 includes a clock signal comparator 202 that receives internal clock signals 1 through N, and compares them with an external clock signal. A clock signal sample component 203 may form an input to the clock signal comparator 202 to periodically sample the external clock signal based on one or more of the internal clock signals. The clock signal comparator may compare various features of the external clock signal with one or more internal clock signals, such as phase differences, timing between active/inactive clock edges, etc.

At least two of the internal clock signals 1-N are input to a clock signal selector 204. Based on a comparison between the external clock signal and one or more of the internal clock signals 1-N, the clock signal comparator 202 generates an output signal on a line 205, which is used to control the clock signal selector 204 and output or select one of the internal clock signals 1-N as a selected clock signal on line 207. A sample and hold component 206 receives the inputting data, and samples and holds it based on the selected clock signal to provide synchronized output data. Examples of specific implementations of the various blocks and components in the retiming system 200 are shown with corresponding broken line boxes in FIG. 1 (where the sample and hold component 206 may be implemented by the D flip-flops 17 and 18).

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read only memory (EEPROM)), embedded microprocessors, firmware, software, etc. If aspects of the invention are embodied as software at at least one stage during manufacturing (e.g. before being embedded in firmware or in a PLD), the software may be carried by any computer readable medium, such as magnetically- or optically-readable disks (fixed or floppy), modulated on a carrier signal or otherwise transmitted, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Figure 3:
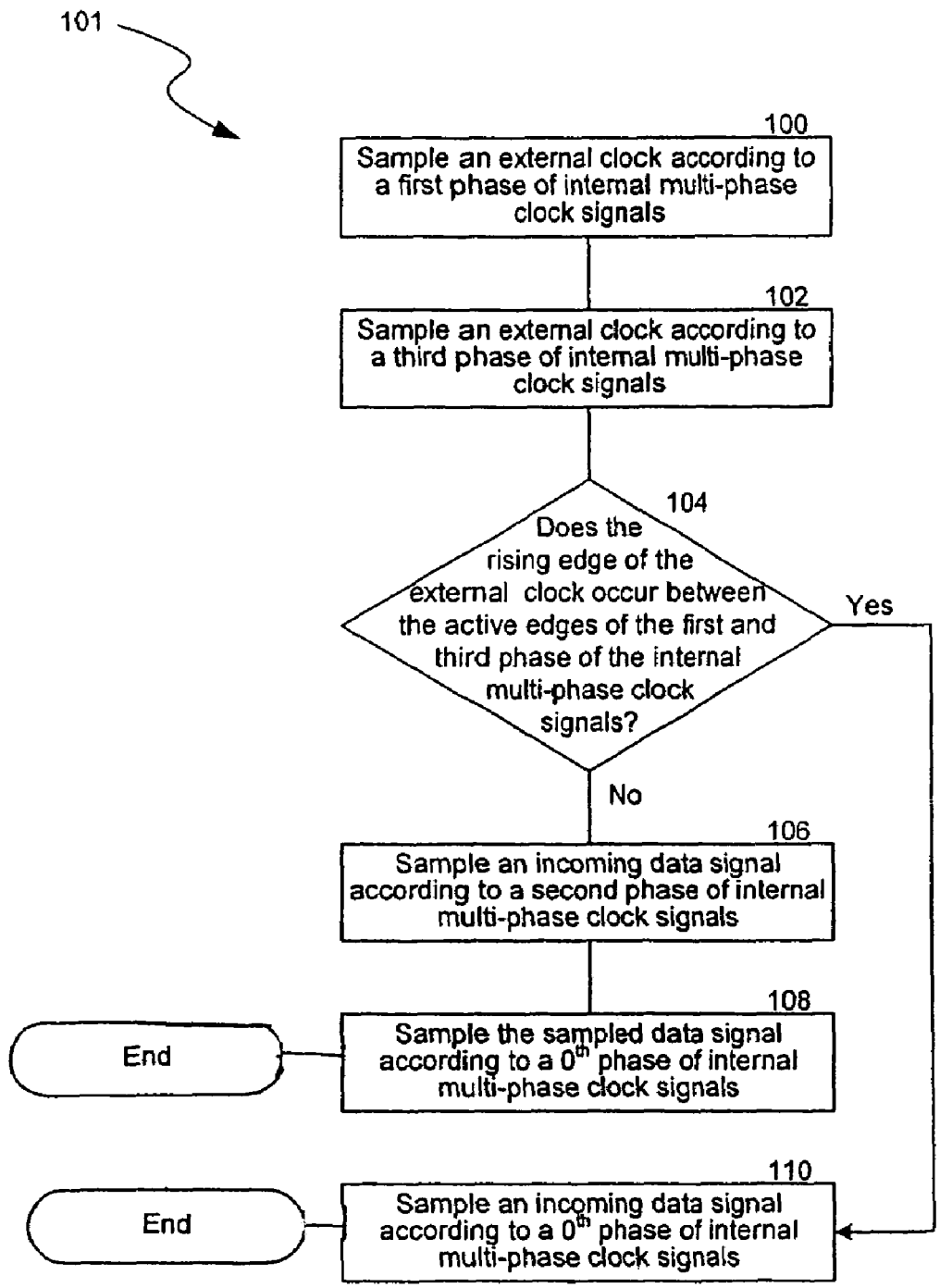
FIG. 3 is a flow chart of one embodiment of a method according to the invention.

With reference to FIG. 3, one embodiment of a method 101 for transferring data across an asynchronous boundary includes sampling an external clock according to first and third phases of internal multi-phase clock signals under blocks 100 and 102, respectively. The method then determines in block 104 if the active edge of the external clock occurs between the active edge of the first and third phases of the internal multi-phase clocks. If it does, then the method samples in block 110 an incoming data signal according to the $0^{th}$ phase of the multi-phase clock signals. If it does not, then the method first samples in block 106 the incoming data signal according to the second phase of the multi-phase clock signals. Thereafter, the method samples the previously sampled data signal according to the $0^{th}$ phase of the internal multi-phase clock signals in block 108. The method continues then with each new input data pulse or other data signal.

Figure 4:
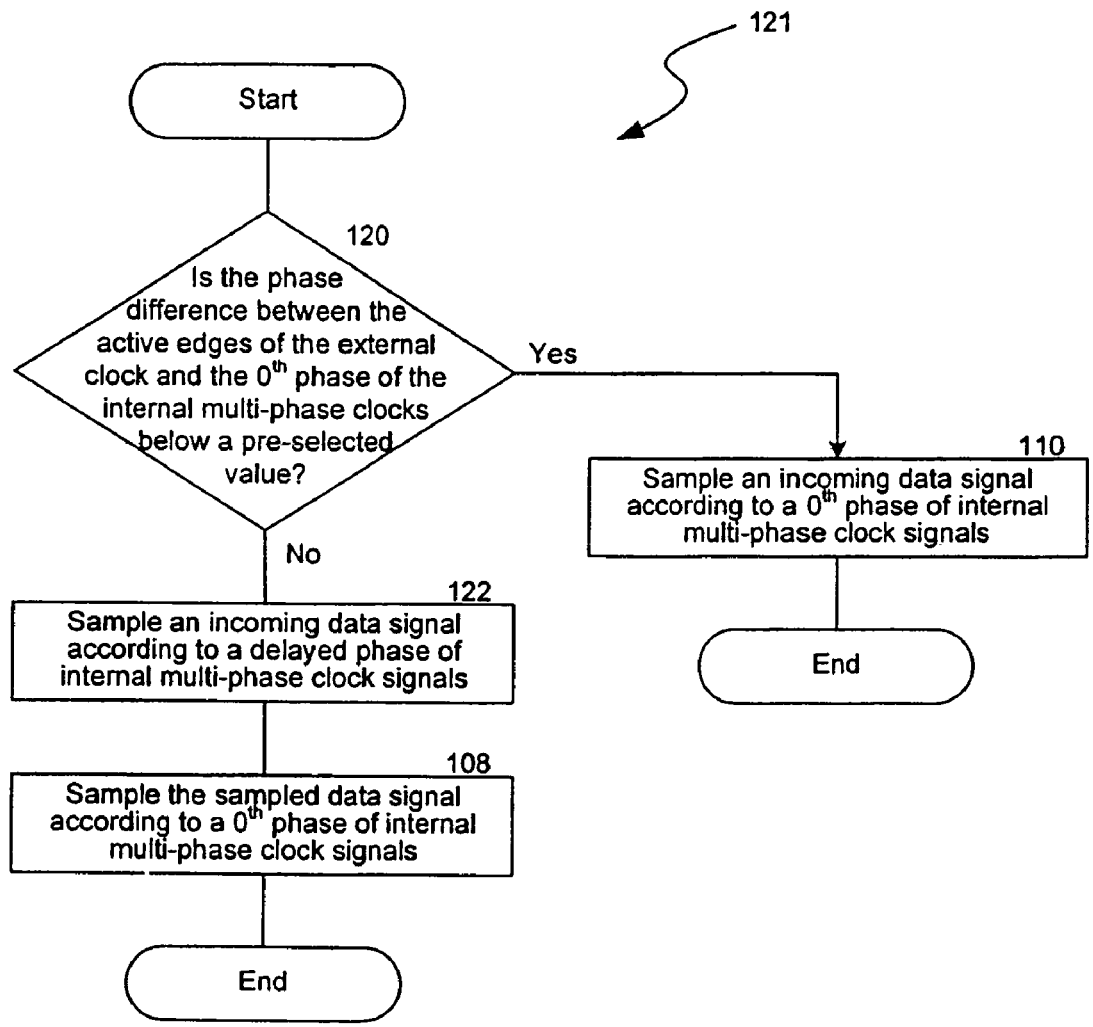
FIG. 4 is a flow chart of another embodiment of a method according to the invention.

As will be obvious to those of skill in the art, other embodiments of a method according to the invention can use more or less than four phases to obtain information about the phase of the external clock. With reference to FIG. 4, another embodiment employs a method 121 for transferring synchronous digital signals across an asynchronous boundary separating an external clock domain and an internal clock domain includes determining in block 120 whether the phase difference between the active edges of an external clock and the $0^{th}$ phase of the internal multi-phase clock signals is below a pre-selected value.

If the phase difference is above the pre-selected value, then the method 121 includes sampling in block 110 an incoming data signal according to the $0^{th}$ phase of the internal multi-phase clock signal. If the phase difference is below the pre-selected value, then the incoming data signal is sampled in block 122 according to a delayed phase of the internal multi-phase clock signal. After sampling the incoming data signal according to the delayed phase, the method can include sampling in block 108 the incoming data signal according to the $0^{th}$ phase of the internal multi-phase clock signals.

Various other alternatives are possible. For example, as described above, the multi-phase clock signals are typically synchronized. In an alternative embodiment, the clock signals need not be synchronized, but additional circuitry, such as buffering circuits, are provided to so compensate. Rather than employing a $0^{th}$ phase internal clock signal, the external clock signal may be substituted in certain environments. While the four phases of the multi-phase clock signals are described above as being 90° out of phase, different phase differences may be employed.

Furthermore, while embodiments are described above as effectively synchronizing in external data signal from a source domain with one of several internal clock signals in a destination domain, an alternative embodiment could sample a clock of the destination domain and delay the data signal in the source domain before exporting it to the destination domain. Thus, under this alternative embodiment, the destination domain receives a data signal that has already been synchronized with the clock of the destination domain.

Embodiments of the invention may be employed in not only systems, but subsystems and even chips. Complicated semiconductor chips having multiple subsystems operating under several different clocks may often be required to transmit data across such chip subsystems. Embodiments of the invention permit data to be transferred across such asynchronous subsystem boundaries without loss in data, thereby reducing bit error rates in the chip. Embodiments of the invention allow one system to receive a data stream synchronized to an external clock and recover and synchronize to the incoming data based on a new or "recovery" clock signal in a quick manner, without losing data in the data stream.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the system described herein. These and other changes can be made to the invention in light of the detailed description. The elements and acts of the various embodiments described above can be combined to provide further embodiments.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a semiconductor chip, other aspects may likewise be embodied in a chip. Accordingly, the inventors reserve the right to add additional claims after filing the application to pursue such additional claim forms for other aspects of the invention.

We claim:

1. A retiming circuit for transferring synchronous digital signals across an asynchronous boundary, the retiming circuit comprising:
   a first flip-flop having a first data input, a first clock input, and a first output, the first data input coupled to an external clock line, the first clock input coupled to a first phase of an internal clock, the first flip-flop operative to sample a signal on the external clock line according to the first phase of the internal clock;
   a second flip-flop having a second data input, a second clock input, and a second output, the second data input coupled to the external clock line, the second clock input coupled to a third phase of the internal clock, the second flip-flop operative to sample the signal on the external clock line according to the third phase of the internal clock;
   an inverter having an input and an output, the input coupled to the output of the first flip-flop;
   a NAND gate having at least one output providing an output signal and at least two inputs, a first input coupled to the output of the inverter, a second input coupled to the output of the second flip-flop,
   a third flip-flop having a third data input, a third clock input, and a third output, the third data input coupled to receive an incoming data signal, the third clock input coupled to a second phase of the internal clock, the third flip-flop operative to sample the incoming data signal according to the second phase of the internal clock; and
   a MUX having at least two data inputs, a control input, and an output, a first input coupled to directly receive the incoming data signal, while a second input is coupled to the output of the third flip-flop, and the control input is coupled to the output of the NAND gate, wherein the output of the MUX operative to produce an output signal as an unaltered incoming data signal or an incoming data signal sampled on a rising edge of the second phase of the internal clock depending on the output signal of the NAND gate.

2. The retiming circuit of claim 1, wherein the retiming circuit further comprises:
   a fourth flip-flop having a data input, a clock input, and an output, the data input coupled to receive the output signal of the MUX, and the clock input coupled to the $0^{th}$ phase of the internal clock, wherein the fourth flip-flop is operative to sample the output signal of the MUX according to the 0th phase of the internal clock.

3. A method for transferring synchronous digital signals across an asynchronous boundary separating an external clock domain and an internal clock domain, the method comprising:
   sampling an external clock according to a first phase of internal multi-phase clock signals;
   sampling the external clock according to a third phase of internal multi-phase clock signals;
   determining if the active edge of the external clock is between the active edges of the first and third phases of the internal multi-phase clock signals by inverting the sampled external clock according to the first phase of internal multi-phase clock signal and performing a NAND logical operation on the inverted sample and the sample of the external clock according to the third phase of internal multi-phase clock signal;
   sampling an incoming data signal according to the $0^{th}$ phase of the internal multi-phase clock signals if the active edge of the external clock is between the active edges of the first and third phases of the internal multi-phase clock signals; and
   sampling an incoming data signal according to the second phase of the internal multi-phase clock signals if the active edge of the external clock is not between the active edges of the first and third phases of the internal multi-phase clock signals.

4. A semiconductor chip, comprising:
   a first subsystem providing a data signal and operating with respect to at least a first clock signal;
   a second subsystem coupled to the first subsystem and having:

a clock signal comparator coupled to receive the first clock signal, wherein the clock signal comparator is configured to compare the first clock signal to at least a second clock signal and produce an output signal in response to the comparison;

a clock signal selector coupled to receive the output signal of the clock signal comparator, wherein the clock signal selector is configured to select one of two or more internal clock signals based on the output signal; and a sampling component coupled to receive the data signal from the first subsystem and sample the data signal based on the selected clock signal wherein the clock signal comparator includes an inverter that inverts at least a portion of the first clock signal with respect to the second clock signal, and a NAND gate coupled to receive an output of the inverter and at least a portion of the first clock signal with respect to a third clock signal, wherein the internal clock signals comprise the second and the third clock signals.

5. The semiconductor chip of claim 4, further comprising a clock signal sample component coupled to the clock signal comparator and configured to sample the first clock signal based on at least the second clock signal.

6. The semiconductor chip of claim 4, further comprising a clock signal sample component coupled to the clock signal comparator and configured to sample the first clock signal based on at least the second and the third clock signal, wherein the clock signal sample component includes at least first and second D flip-flops that each receive and output a sample of the first clock signal based on the second and third clock signals, respectively.

7. The semiconductor chip of claim 4 wherein the clock signal selector includes a multiplexer coupled to respond to the output signal of the clock signal comparator.

8. The semiconductor chip of claim 4 wherein the sampling component includes:

at least a first D flip-flop configured to receive and output the data signal based on the selected internal clock signal, and at least a second D flip-flop configured to output either the data signal or an output of the first D flip-flop.

9. The semiconductor chip of claim 4 wherein the sampling component includes at least a first flip-flop configured to receive and output the data signal based on the selected internal clock signal.

10. The semiconductor chip of claim 4 wherein the clock signal comparator is configured to compare active or inactive clock edges of the first clock signal with at least the second clock signal and the third clock signal.

11. The semiconductor chip of claim 4 wherein the clock signal comparator or clock signal selector receive at least the second clock signal and the third clock signal, wherein the second and third clock signals have the same frequency but different phases, and are synchronized with each other.

12. The semiconductor chip of claim 4 wherein the clock signal comparator receives at least the second clock signal and a third clock signal, wherein the second and third clock signals are 180 degrees out of phase with each other.

* * * * *